United States Patent [19]

Whelan

[11] 3,748,072

[45] July 24, 1973

[54] APPARATUS FOR COMPACTING CURD IN THE PROCESS OF MANUFACTURING CHEESE

[75] Inventor: Edmund Kerran Whelan, Hawera, New Zealand

[73] Assignee: The National Dairy Association of New Zealand Limited, Wellington, New Zealand

[22] Filed: Jan. 6, 1972

[21] Appl. No.: 215,778

[52] U.S. Cl. .................. 425/85, 425/405, 425/352, 425/412, 425/416
[51] Int. Cl. .............................................. B30b 9/26
[58] Field of Search ....................... 425/84, 85, 352, 425/354, 355, 356, 405, 405 H, 406, 412, 415, 444

[56] References Cited
UNITED STATES PATENTS

| | | | |
|---|---|---|---|
| 929,384 | 7/1909 | Brown et al. | 425/84 X |
| 2,904,835 | 9/1959 | Thomas | 425/84 X |
| 3,317,999 | 5/1967 | Royer et al. | 425/84 |
| 3,355,805 | 12/1967 | Krueger et al. | 425/84 X |
| 3,526,688 | 9/1970 | Shelton et al. | 425/405 X |

Primary Examiner—J. Howard Flint, Jr.
Attorney—Eric H. Waters et al.

[57] ABSTRACT

Apparatus is disclosed for compacting curd in the process of manufacturing cheese, the object being to provide apparatus whereby a mass of curd can be vacuum pressed into a single block of such large dimensions as to enable it to be cut into a plurality of separate pieces of a size comparable with or corresponding to that of standard unwrapped cheeses or consumer portions or wrapped as a complete block or part thereof, the apparatus thus having the important advantage of avoiding the time-consuming procedure hitherto adopted of vacuum pressing relatively small quantities of curd in separate hoops to form individual cheeses. The apparatus comprises a perforated metal sleeve adapted to receive a mass of curd. A metal casing surrounds the sleeve in such manner that a jacketed space is formed between the two. A lid or cover plate closes one end of the casing. The lid or cover plate is held removably in closed position. A piston slidably engages in the sleeve and is moved toward and away from the lid or cover plate when applied. The jacketed space between the sleeve and casing can be placed in communication with a source of vacuum, the sleeve being of four-sided prismatic shape and of such internal capacity that when a sufficient quantity of curd has been placed therein and has been vacuumized through the jacketed space and the perforations in the sleeve and has also been compressed by the piston, there will be formed a compacted block of curd of such large size that when freed, or while being freed, from the sleeve, it can be cut into a plurality of pieces of a size comparable with or corresponding to that of unwrapped cheese of standard size or consumer portions.

6 Claims, 4 Drawing Figures

United States Patent [19]
Whelan
[11] 3,748,072
[45] July 24, 1973
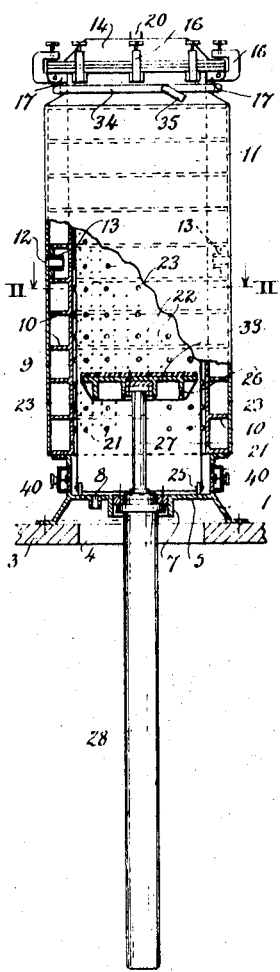

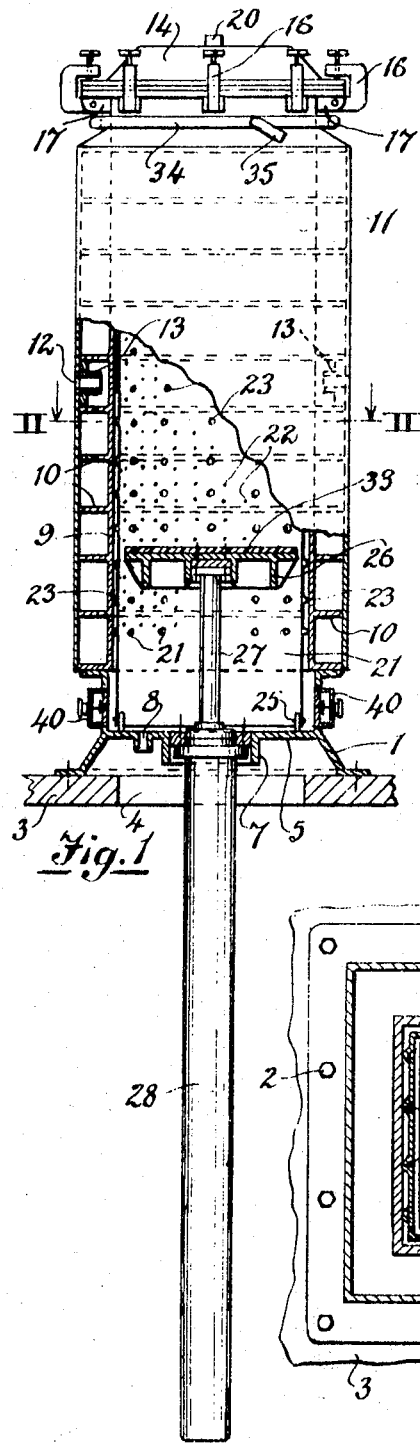
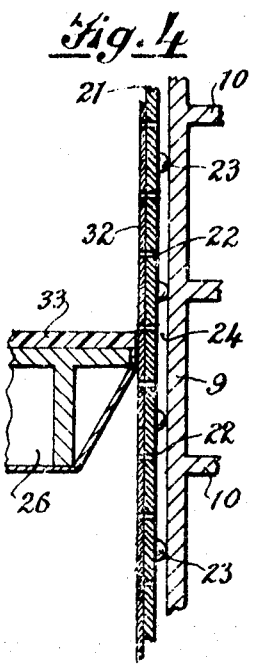
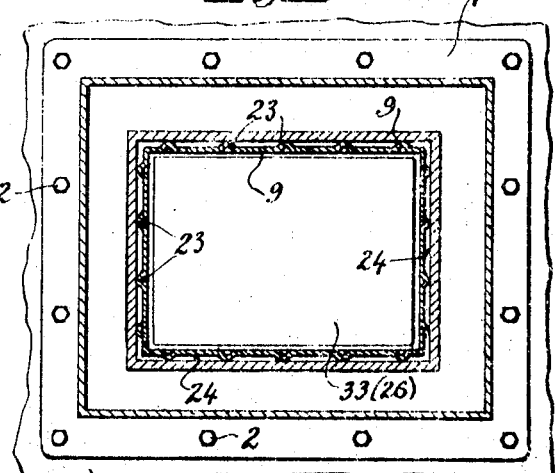

APPARATUS FOR COMPACTING CURD IN THE PROCESS OF MANUFACTURING CHEESE

The invention relates to apparatus for compacting curd in the process of manufacturing cheese, the object of the invention being to provide apparatus whereby a mass of curd can be vacuum pressed into a single block of such large dimensions as to enable it to be cut into a plurality of separate pieces of a size comparable with or corresponding to that of standard unwrapped cheeses or consumer portions or wrapped as a complete block or part thereof, the apparatus thus having the important advantage of avoiding the time-consuming procedure hitherto adopted of vacuum pressing relatively small quantities of curd in separate hoops to form individual cheeses.

The apparatus of the invention comprises a pedestal, a vertically disposed tubular metal casing mounted on and secured to the pedestal, a vertically disposed perforated metal sleeve of rectangular shape in cross-section arranged within the casing in such a manner that a jacketed space is formed between the two, the sleeve also being secured against movement to the pedestal and being adapted to receive a mass of curd, a lid or cover plate for closing the upper end of the casing, means for holding the lid or cover plate removably in closed position, a piston engaged for upward and downward movement within the perforated sleeve, the piston being secured to the upper end of the actuating rod of a vertically disposed ram the cylinder of which is secured to and suspended from the pedestal, and means enabling the jacketed space between the casing and the sleeve to be placed in communication with a source of vacuum.

An embodiment of the apparaturs of the invention will now be described with reference to the accompanying drawings, in which:

FIG. 1 is a side elevational view, partly in section, of the apparatus;

FIG. 2 is a sectional plan view to an enlarged scale on the line II — II in FIG. 1;

FIG. 4 is a fragmentary vertical sectional view illustrating certain details to a still further enlarged scale.

Figure 3:
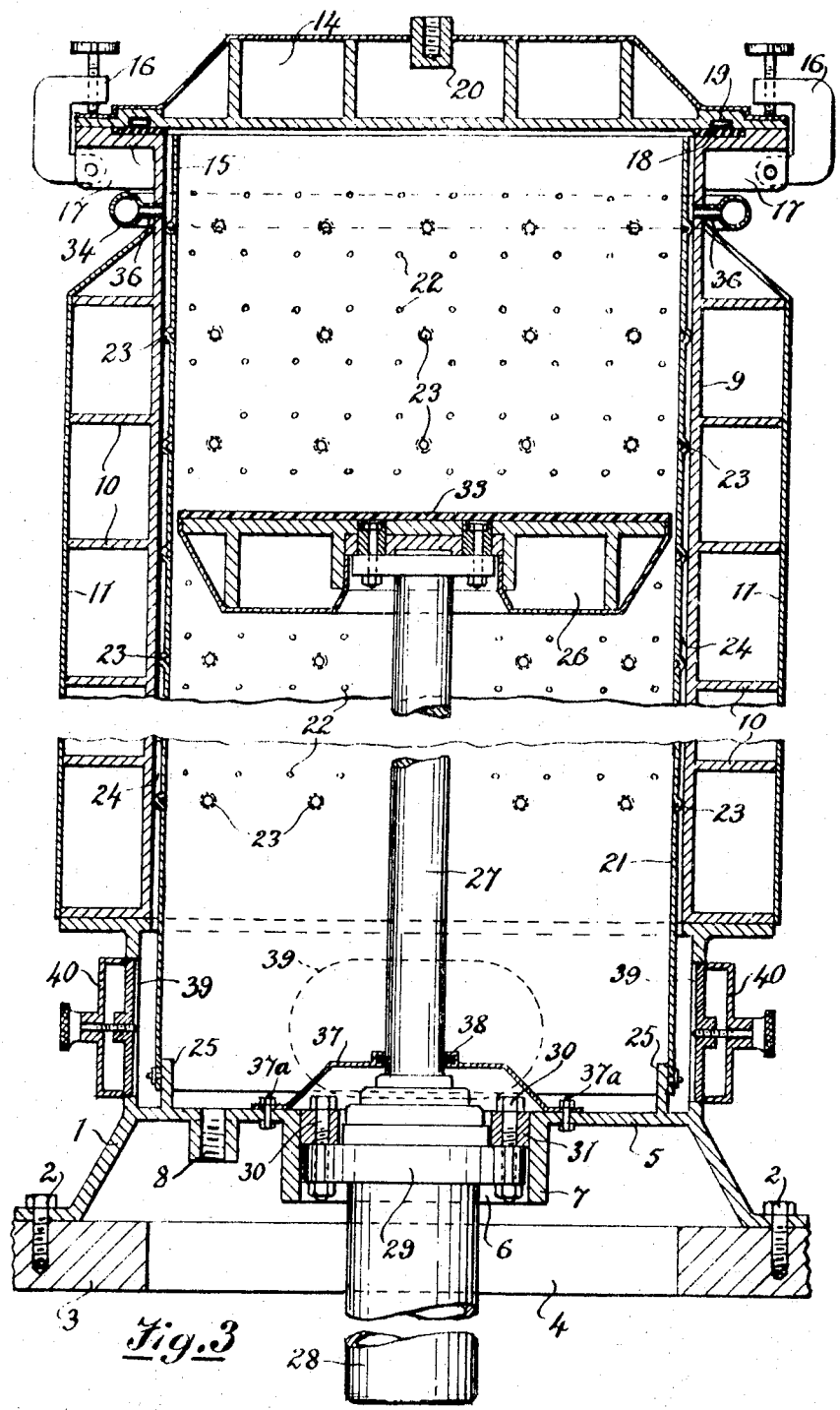
FIG. 3 is a vertical sectional view of the apparatus to a further enlarged scale.

The apparatus illustrated comprises a metal pedestal 1 which is secured by bolts 2 (FIGS. 2 and 3) upon a floor 3 in a suitable part of a cheese factory, the pedestal being arranged over an opening 4 in the floor. The floor 3 may be a ground floor in which case it will form also the ceiling of a basement room with which the opening 4 is in communication, or it may be the floor of an upstairs room, in which case the opening 4 will be in communication with the room beneath. Between its upper and lower edges, the pedestal 1 is formed with a horizontal partition 5 containing a centrally disposed opening 6 (FIG. 3) which lies over the opening 4 in the floor 3 and is defined by a depending marginal skirt portion 7 forming part of the pedestal. To one side of the opening 6, the partition 5 in the pedestal 1 is formed with a drain hole 8 to which a valve-controlled drain pipe (not shown) can be connected, this pipe passing through the opening 4 in the floor 3 to the room beneath.

Upon the pedestal there is mounted and secured a vertically disposed casing 9 of four-sided prismatic form and of rectangular shape in cross-section (see FIG. 2) the casing being made from sheet metal and being strengthened by the provision of a plurality of horizontally disposed metal rib members 10 which are spaced one above the other around the outside of the casing and are joined at their inner edges to the casing.

The rib members 10 of the casing 9 are enclosed in a shell or sheathing 11 of sheet metal which lies against the outer edges of the rib members and serves to give the assembly a neat and smooth external appearance. As shown in FIG. 1, the shell 11 is formed, on opposite sides, with holes 12 which continue through plates 13 secured between two adjacent ribs 10 on the casing 9, this arrangement enabling the assembly of casing and shell to be connected to lifting tackle used during assembly of the apparatus.

The upper end of the casing 9 is provided with a removable lid or cover plate 14 which normally bears on an outwardly projecting flange 15 formed on the casing. The lid 14 is normally held tightly in place by means of a series of G-clamps 16 (FIGS. 1 and 3) distributed around the top of the casing 9. The body parts of the clamps 16 are pivotally connected to lugs 17 provided on the upper end part of the casing 9 and positioned just beneath the flange 15, the screws of the clamps being adapted to bear on the marginal part of the lid 14. In the upper face of the flange 15 there is formed a recess containing a gasket 18 (FIG. 3) of rubber or like resilient material. In the under face of the marginal part of the lid 14 there is formed a groove containing a sealing ring 19 of rubber or other suitable material. When the clamps 16 are in operative position and the screws thereof are tightened down on to the lid 14, the sealing ring 19 and gasket 18 become compacted together, thereby forming an air-tight joint between the lid 14 and the flange 15 on the upper end of the casing 9. The lid 14 is formed with a screw-threaded socket 20 enabling it to be connected to lifting tackle when the screws of the G-clamps 16 have been loosened and the clamps swung outwardly and downwardly to thereby free the lid for removal.

Within the casing 9 there is provided a metal sleeve 21 which is also of four-sided prismatic form and of rectangular shape in cross-section, the sides of the sleeve being formed with a multiplicity of perforations some of which are indicated at 22 in FIGS. 1 and 3. The sides of the sleeve 21 are also formed with a multiplicity of outwardly projecting nodules 23 the peaks of which bear against the inside faces of the casing 9, thereby providing a jacketed space 24 between sleeve and casing. The lower end part of the sleeve 21 projects below the casing 9 and enters the upper part of the pedestal 1, this part of the sleeve being secured to lugs 25 (FIGS. 1 and 3) provided on the partition 5 of the pedestal. This arrangement acts to hold the sleeve 21 against vertical movement, lateral movement of the sleeve being prevented by engagement of the peaks of the nodules 23 with the inside faces of the casing 9.

The sleeve 21 contains a piston 26 having a flat upper surface, the piston being secured to the upper end of the actuating rod 27 of a vertically disposed ram, the cylinder of which is indicated at 28 in FIGS. 1 and 3. The upper end part of the ram cylinder 28 has a flange 29 (FIG. 3) which lies within the opening 6 in the partition 5 of the pedestal 1, the cylinder being secured to and suspended from the pedestal by means of bolts 30 which pass through an abutment ring 31 secured within the opening 6 and through the flange 29 on the cylinder. The part of the cylinder 28 lying below the flange 29 passes down through the opening 4 in the floor 3 and into the room lying below this floor, the cylinder being provided with the necessary valve-controlled pressure-fluid connections (not shown) for actuating the rod 27 of the ram when desired.

The piston is of such cross-sectional size as to allow for the presence in the sleeve of a thin perforated line 32 (FIG. 4) made from a suitable kind of plastic or stainless steel, while still leaving the piston with a working clearance. The flat top of the piston acts as a support for a facing pad 33 of white rubber or other suitable resilient material which promotes the obtaining of a close working fit between the piston and the inner faces of the liner 32.

Around the upper end part of the casing 9 and just below the lugs 17 there is provided a hollow manifold 34 having a tubular spigot 35 (FIG. 1) to which one end of a pipe (not shown) can be joined, the other end of the pipe being connected to a vacuum pump or to a vacuum chamber forming part of a vacuum pump unit. The manifold is provided with a plurality of inwardly projecting tubular branches 36 (FIG. 3) which pass through the casing 9 and open to the jacketed space 24 lying between the inside faces of the casing and the outer faces of the sleeve 21.

Within the upper part of the pedestal 1 there is preferably provided an inverted dish-shaped plate 37 (FIG. 3) which covers the upper end of the ram cylinder 28 and surrounds the actuating rod 27 at a point lying close to this end of the cylinder. This plate is secured to the partition 5 of the pedestal by means of bolts 37a, while the central part of the plate that actually surrounds the rod 27 is formed with an annular groove containing a sealing ring 38 which bears against the outer surface of the rod and acts to prevent any pressure fluid that may leak from the upper end of the cylinder from finding its way into the part of the pedestal 1 that surrounds the plate 34 and contains the lower end part of the sleeve 21.

The side walls of the part of the pedestal 1 that lies above the partition 5 are formed with inspection ports 39 which are normally closed by removable but tightly fitting covers 40 (FIGS. 1 and 3).

In practice, the sleeve 21, when viewed in plan, may measure, say twentyeight inches in breadth by twentytwo inches in width, these dimensions giving a cross-sectional area corresponding substantially to the total cross-sectional area of four unwrapped cheeses of conventional size. The height of the sleeve may conveniently be between seven and eight feet. With these several dimensions and subject to the piston 26 being placed in its fully retracted position to start with, and to the presence of the liner 32 which is, in any case, quite thin, the part of the sleeve lying between the piston and the lid 14 will have a cubic capacity permitting of the production of a block of vacuum pressed curd of such dimensions as to enable it to be cut not only into a group of four cheeses in the cross-section, but also into several groups of cheeses with four cheeses in each group.

The apparatus is used as follows:

The G-clamps 16 are brought to their inoperative posisitions and the lid 14 is then removed. The ram is now operated to cause the actuating rod 27 thereof to be retracted until the piston 26 is brought down to its lowermost position, thus position being approximately that shown in FIG. 1. When this position has been reached, the perforated liner 32 is inserted in the sleeve 21 through the open top of the casing 9, the liner then being pushed down so that it surrounds the piston 26 and the pad 33 and becomes fully accomodated within the sleeve.

The ram is, if necessary, now operated again to raise the piston 26 to a starting position in which the space lying between the pad 33 on the top of the piston and the open top of the casing 9 is of predetermined capacity, movement of the piston in this direction then being halted.

A mass of curd, in chopped or strip condition and of predetermined weight, is now poured into the open top of the liner 32 within the sleeve 21, the curd thus being received in the space lying between the pad 33 on top of the piston 26 and the top of the liner. As, in the embodiment illustrated, the apparatus stands vertically and can be supplied with curd from above after the lid 13 has been removed, the curd-loading opeation may be performed by the use of an endless belt conveyor having its discharge end lying above the top of the casing 9, the curd being placed on the entry end of the upper run of the conveyor and eventually falling from the discharge end thereof into the open space within the upper part of the liner 32.

When the filling operation has been completed, the lid 14 is applied to the top of the casing 9 and fastened down tightly by means of the clamps 16.

As the next step, the valve in the drain pipe extending from the drain hole 8 is closed, whereupon the jacketed space 24 between the casing 9 and the sleeve 21 is placed in communication with the source of vacuum by way of the manifold 34 and its branches 36, the curd within the liner 32 thus becoming vacuumized through the perforations in the sleeve 21 and liner. This vacuumizing step takes place at first without any pressure being applied to the curd by upward movement of the piston 26, the ram 27/28 thus being idle during this time. The vacuumizing step just referred to results in extraction from the curd of occluded air and whey, the extracted whey then trickling down the jacketed space 24 and accumulating in the upper part of the pedestal 1.

While vacuumization continues, the ram 27/28 is operated to cause the actuating rod thereof to move upwardly and thus raise the piston 26 to such an extent as to result in the curd being compressed only at a relatively low pressure between the pad 33 on the piston and the lid 14, such compression resulting in further extraction of air and whey from the curd and collection of the whey in the upper part of the pedestal 1.

After application of the vacuumizing step with low pressure from the piston 26, vacuumizing ceases and the ram is now operated again to cause the rod 27 thereof to further raise the piston 26 thereby applying high pressure to the already partly compacted curd, the high pressure being usually of the order of sixtyfive pounds to the square inch. The approximate position of the piston 26 when it is at the end of its maximum compressio stroke is indicated in FIG. 3.

When the piston 26 is moved to exert pressure on the curd, the pressure will tend to expand laterally the resilient pad 33 on top of the piston, thus promoting a good sealing effect between the edges of the pad and the inner faces of the liner 32, and ensuring that the compressed curd will not escape past the piston.

The high pressure phase is continued for a length of time that will be known to the experienced cheese producer, whereafter pressurization is brought to an end and the lid 14 then removed. At the same time, the valve in the drain pipe is opened to thus allow the whey that has accumulated in the upper part of the pedestal 1 to flow out through the drain hole 8, the whey then being disposed of as waste or utilized for suitable industrial processing.

The ram is next operated to cause the rod 27 thereof to lower the piston 26 sufficiently to allow the block of fully compressed curd to first hang freely in the liner 32 and then drop of its own accord by a distance ensuring that it will disengage itself from the perforations in the liner.

As a final step the ram is used to cause the piston 26 to push the block out of the liner 32 through the open top of the casing 9.

The block of fully compressed curd may be entirely ejected from the liner 32 before it is cut into cheeses of standard unwrapped size, or wrapped as a complete block or parts thereof, or there may be provided, in conjunction with the apparatus, means for progressively cutting the block into groups of such cheeses as the block is ejected, in step-by-step fashion, from the liner.

We claim:

1. Apparatus for compacting curd in the process of manufacturing cheese, comprising a pedestal, a vertically disposed tubular metal casing mounted on and secured to the pedestal, a vertically disposed perforated metal sleeve of rectangular shape in cross-section arranged within the casing in such a manner that a jacketed space is formed between the two, the sleeve also being secured against movement to the pedestal and being adapted to receive a mass of curd, a cover plate for closing the upper end of the casing, means for holding the cover plate removably in closed position, a piston engaged for upward and downward movement within the perforated sleeve, the piston being secured to the upper end of the actuating rod of a vertically disposed ram the cylinder of which is secured to and suspended from the pedestal, and means enabling the jacketed space between the casing and the sleeve to be placed in communication with a source of vacuum.

2. Apparatus in accordance with claim 1 and wherein the casing is of four-sided prismatic form and the sides of the perforated sleeve are formed with a plurality of outwardly projecting nodules the peaks of which bear against the inside faces of the casing, thereby providing the jacketed space between the sleeve and casing.

3. Apparatus in accordance with claim 2 and wherein the piston is of such cross-sectional size as to allow for the presence in the perforated sleeve of a perforated liner made from a suitable kind of plastic or stainless steel.

4. Apparatus in accordance with claim 2 and wherein the upper surface of the piston is flat and forms a support for a pad of resilient material.

5. Apparatus in accordance with claim 1 and wherein a hollow manifold surrounds the upper end part of the casing, the manifold having means enabling its interior to be connected by a pipe to the source of vacuum, and also having a plurality of inwardly projecting branches which open into the jacketed space between sleeve and casing.

6. Apparatus in accordance with claim 1 and wherein the pedestal is formed with inspection ports which are normally closed by removable cover plates.

* * * * *